July 3, 1945.    W. A. CHARBONNEAUX    2,379,415
ALTERNATING CURRENT CONTROL OR REGULATING APPARATUS
Filed Aug. 11, 1941    3 Sheets-Sheet 1

INVENTOR.
WILSON A. CHARBONNEAUX
BY
ATTORNEY

July 3, 1945.   W. A. CHARBONNEAUX   2,379,415
ALTERNATING CURRENT CONTROL OR REGULATING APPARATUS
Filed Aug. 11, 1941   3 Sheets-Sheet 2

INVENTOR.
WILSON A. CHARBONNEAUX
BY
ATTORNEY

INVENTOR.
WILSON A. CHARBONNEAUX
BY
ATTORNEY

Patented July 3, 1945

2,379,415

UNITED STATES PATENT OFFICE 2,379,415

ALTERNATING CURRENT CONTROL OR REGULATING APPARATUS

Wilson A. Charbonneaux, Burlington, Iowa

Application August 11, 1941, Serial No. 406,420

8 Claims. (Cl. 200—92)

This invention relates generally to alternating current control or regulating apparatus and, more particularly, to a certain new and useful improvement in apparatus for effecting frequency matching between alternating current generators and the like.

My invention has for its primary objects the provision of apparatus of the type and for the purpose stated which is relatively simple in structure, which is substantially free from the danger of over-control or so-called hunting, and which is extremely sensitive, precise, effective, and efficient in the performance of its intended functions.

And with the above and other objects in view, my invention resides in the novel features of form, construction, arrangement, and combination of parts presently described and pointed out in the claims.

In the accompanying drawings (three sheets),

Figures 1, 2, 3:
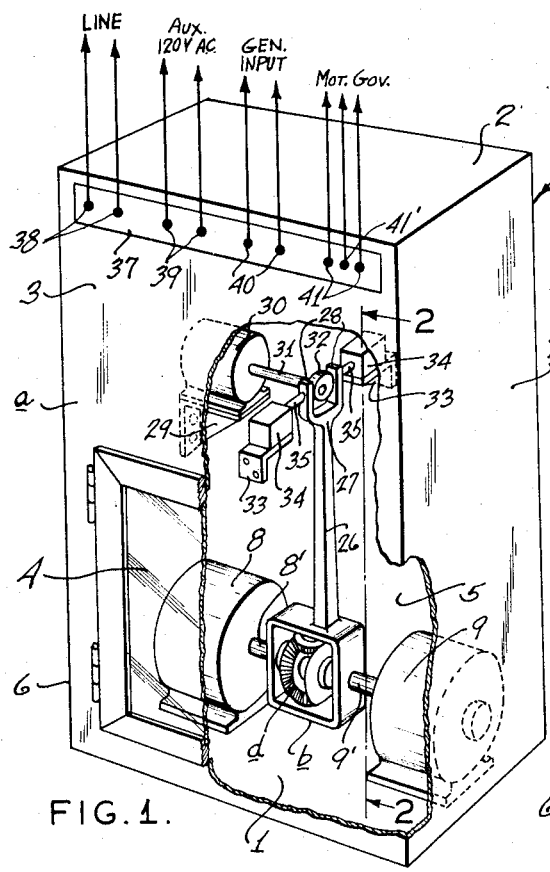
Figure 1 is a partly broken perspective view of a frequency regulator constructed in accordance with and embodying my present invention.
Figure 2 is an enlarged fragmentary vertical sectional view of the regulator taken approximately along the line 2—2, Figure 1.
Figure 3 is an enlarged fragmentary sectional view of the regulator taken approximately on the line 3—3, Figure 2.

Referring now in more detail and by reference characters to the drawings, which illustrate practical embodiments of my present invention, the frequency regulator of Figures 1 to 4, both inclusive, generally designated A, comprises a preferably rectangular cabinet or housing $a$ constructed of sheet steel or other suitable material and conventionally including a bottom wall 1, a top wall 2, a front wall 3 having a swingable window-section 4, a rear wall 5, and opposite side walls 6, 7.

Disposed within the housing or cabinet $a$ and bolted or otherwise rigidly secured upon the upper face of the bottom wall 2, are two synchronous motors 8, 9, having drive-shafts 8', 9', rotatable in opposite directions and terminating in endwise spaced co-axial alignment.

Journaled equally for rotation upon, and spanning the gap between, the shafts 8', 9', is a box-shaped shell or frame $b$, which includes opposed parallel end-members 10 connected by parallel cross-members 11.

Pinned or otherwise fixed upon each of the shafts 8', 9', and abutting against the inner faces of the end-members 10, are disks 13, and co-axially riveted or otherwise secured, as at 14, upon the free ends of the shafts 8', 9', are clutch disks 15 suitably faced with friction rings 16.

Also journaled for free rotation on the ends of the shafts 8', 9', within the shell or frame $b$, are bevel gears 17 having outwardly presented machined faces 18 for engagement with the friction rings 16.

Also mounted upon the shafts 8', 9', and abutting the hubs 19 of the bevel gears 17, are conventional ball bearing thrust-collars 20, and coiled on the shafts 8', 9', and yieldingly impinging against the respective thrust-collars 20 and the stop-disks 13 for biasing the bevel gears 17 toward the friction rings 16 in the manner of a friction clutch, are suitable compression springs 21.

Fixed in, and projecting inwardly from, the cross-members 11 of the frame or shell $b$, is a pair of axially aligned studs 22 having their axes disposed midway between the ends, and in a plane perpendicular to the longitudinal axes, of the shafts 8', 9'. At their respective inner ends, the studs 22 are provided with diametrically enlarged heads 23, and mounted for rotation upon the studs 22 intermediate the frame cross-members 11 and the heads 23, are bevel gears 24 having meshing engagement with the bevel gears 17 in the provision of a unique slip-clutch driven differential mechanism $d$, bronze wear-bushings 25 being preferably interposed on the studs 22, all as best seen in Figure 3.

Formed preferably integrally with, and projecting upwardly from, the upper cross-member 11 of the frame or shell $b$, is a suitably elongated arm 26 provided at its upper end with a yoke 27 having spaced parallel upstanding tines 28, and supported within the cabinet a as by means of a suitable angle-bracket 29 fixed upon the cabinet side wall 6, is a small constant speed motor 30 having a drive shaft 31 suitably extended to project and terminate at its free end, and being provided at such end with an eccentric cam 32 having a maximum diametral distance from the center of the shaft 31 substantially equal to half the distance, between the opposed faces of the tines 28 of the yoke 27. Preferably, though not necessarily, the axis of the shaft 31 is disposed in vertically aligned parallelism with the axis of the shafts 8', 9', and the differential shell or frame b and its associated arm 26 are so arranged that their vertical axes will normally lie in the plane of the axes of the shafts 8', 9', and 31, which plane may, for purposes of convenience, be termed the neutral or normal plane or position, all as best seen in Figure 2 and for purposes presently more fully appearing.

Suitably supported, as by means of conventional angle brackets 33, upon the cabinet front and rear walls 4, 5, are opposed switches 34 preferably of any simple spring-biased, make-and-break type and having actuating plungers 35 presented inwardly of the cabinet a in alignment with, and having preferably rounded free ends 36 normally positioned, as when the arm 26 is in neutral position, in relatively close adjacence to, the yoke-tines 28, as best seen in Figure 2.

As is customary in practically all electrical control apparatus or structures, the cabinet front wall 4 is, for convenience, provided with a terminal block 37 having three pairs of conventional terminal posts 38, 39, and 40, respectively designated "Line," "Aux. 120 V. A. C.," and "Generator Input," the block 37, in the present instance, being further provided with one additional group of terminal posts, designated "Motor Governor," including two paired posts 41 and one intermediate or auxiliary post 41'.

The pairs of terminal posts 38, 39, and 40 are, respectively, connected electrically within the cabinet a to the synchronous motor 8, the auxiliary motor 30, and the synchronous motor 9. The two paired terminal posts 41 are, respectively, connected electrically to one of the terminals of each of the reversing switches 34, the other terminals of which are electrically connected by a common lead to each other and to the intermediate or auxiliary terminal post 41'.

Where the regulator A is employed to maintain a matched frequency condition between two selected alternators $G_1$, $G_2$, which are, for example, connected to suitable primary movers $P_1$, $P_2$, the terminal posts 38 are connected across one phase of the alternator $G_1$, which, for purposes of the present explanation, may be considered the primary generator, that is to say, the generator to which the frequency of the output of the alternator $G_2$ is to be matched. In this connection, it should also be noted that the prime mover $P_1$, associated with such primary alternator $G_1$, may, for example, be controlled by a governor motor $M_1$ conveniently connected through a rheostat or other motor control $R_1$ to any convenient source 42 of electric current supply.

Figure 4:
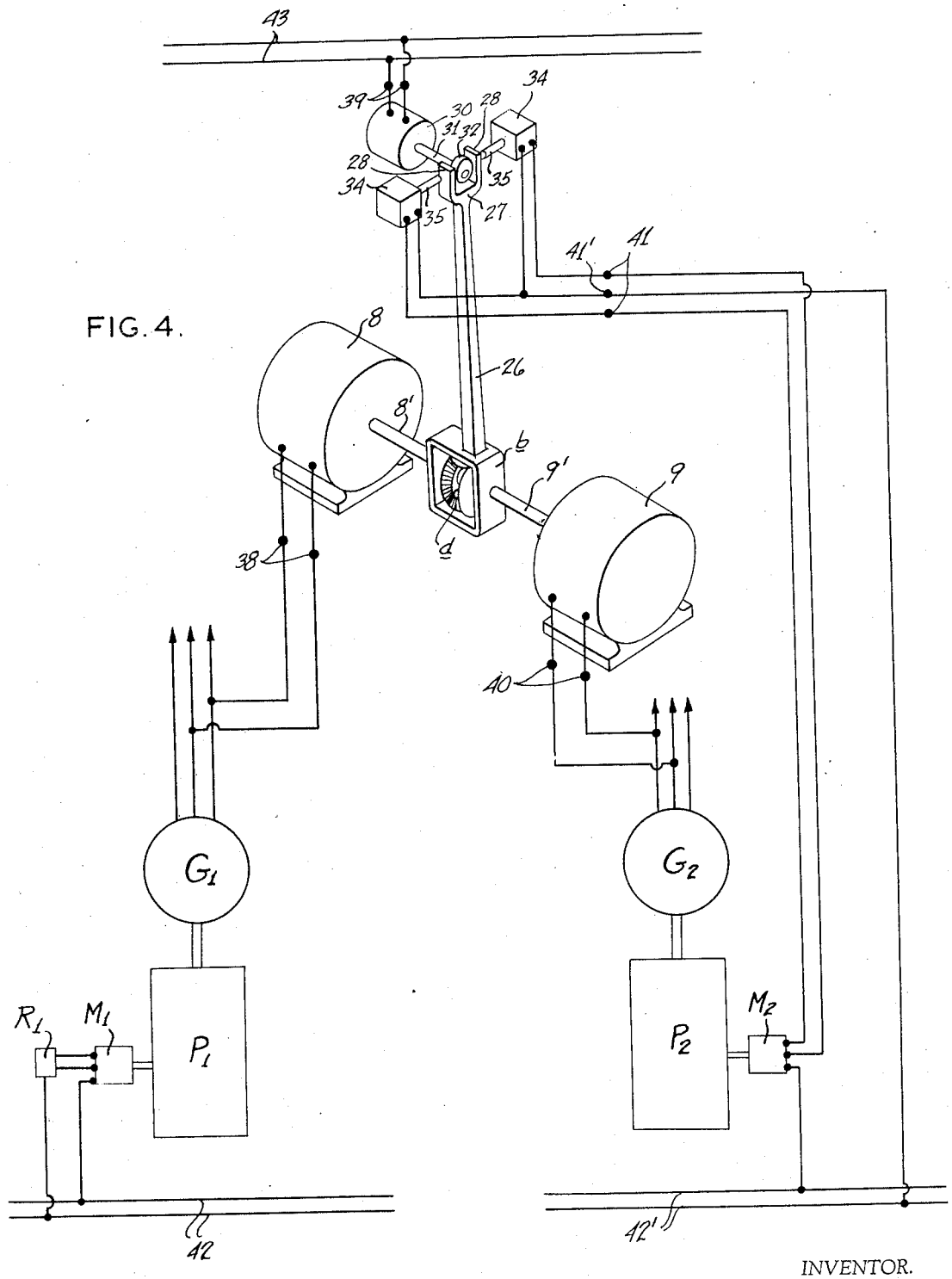
Figure 4 is a diagrammatic illustration of the wiring in which the regulator is connected for effectuating frequency matching control upon two alternators.

Similarly the terminal posts 39 are connected to any suitable or convenient source 43 of 120 v. alternating current, and the terminal posts 40 are connected to the corresponding or matching phase of the generator $G_2$. Likewise the terminal posts 41 are connected to a governor motor $M_2$, and finally the terminal post 41' is connected to one side of a motor governor supply line 42', the other side of which is connected directly to the governor motor $M_2$, all as best seen in Figure 4.

In use and operation, the synchronous motor 8 is constantly driven at a speed which is directly proportional to the frequency of the output of alternator $G_1$. Similarly, the synchronous motor 9 is driven in the opposite direction to the motor 8 at a speed which is directly proportional to the frequency of alternator $G_2$. As long as the frequencies of the two alternators $G_1$, $G_2$, are identical, the speeds of the motors 8, 9, will be precisely equal and opposite, and no movement will be transmitted through the differential mechanism d to the arm 26. However, should the frequency of either of the alternators $G_1$, $G_2$, vary with respect to the other, the speed of the synchronous motors 8, 9, will reflect a proportional variation, and such variation will produce a relative movement within the differential mechanism d, causing the frame or shell b and the associated arm 26 to rock in one direction or the other, depending upon the positive or negative character of such speed difference. As the arm 26 rocks, either one or the other of the tines 28 will engage the rounded end 36 of, and depressingly actuate, the adjacent switch-plunger 35, closing the associated switch 34 and completing the circuit to the governor motor $M_2$, thereby causing the prime mover $P_2$ to speed up or slow down, as the case may be. In this connection, it should be noted that, when the limit of movement of the plungers 35 has been reached, the clutch friction-rings 16 will slip, thereby obviating any jamming or other damage of the differential mechanism d.

As the yoke-tines 28 shift position in response to movement transmitted through the differential mechanism d, the continuously rotating cam 32, driven by the auxiliary motor 30, will periodically force the arm 26 back to neutral position, introducing momentary slippage between the friction rings 16 and bevel gears 17. As long as the alternators $G_1$, $G_2$, are generating unmatched frequencies, the control impulse will be intermittently transmitted to the governor motor $M_2$, thereby preventing over-travel or hunting in the controlled system.

In addition, it will be evident that the amount of rocking movement of the arm 26 will depend upon the magnitude of difference between the speeds of the synchronous motors 8, 9. Where the difference in frequency of the alternators $G_1$, $G_2$, is very small, the speed-differential between the motors 8, 9, will be small and the rate of movement or oscillation of the arm 26 will be correspondingly slow.

Therefore, the arm 26 will rock or oscillate only for a short distance and will be almost immediately restored to neutral position by the cam 32, so that the particular switch 34 associated with the plunger 35, which is actuated thereby, will remain closed for only a very short interval. On the other hand, if the difference in frequency between the alternators $G_1$, $G_2$, is large, the rate of movement or oscillation of the rock arm 26 will be relatively rapid, and thus its amplitude of movement will be correspondingly greater before it is returned to neutral position. Consequently the particular switch 34 associated with the plunger 35 which is depressed, depending upon the positive or negative direction of movement of the arm 26, will remain closed for a correspondingly longer interval, thereby imposing a controlling impulse upon the governor motor $M_2$ for a longer period of time and achieving a greater controlling effect upon the prime mover $P_2$ and the frequency of the output of the alternator $G_2$.

Figure 5:
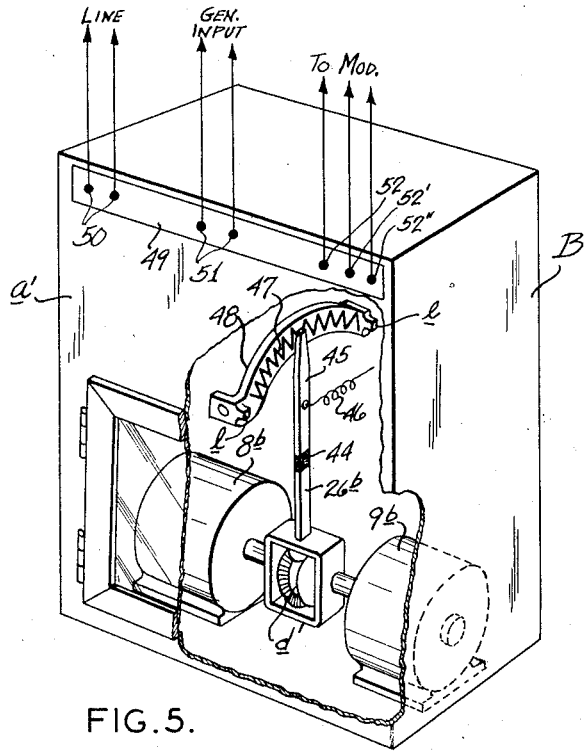
Figure 5 is a partly broken perspective view of a modified frequency regulator constructed in accordance with and embodying my present invention.
Figure 6:
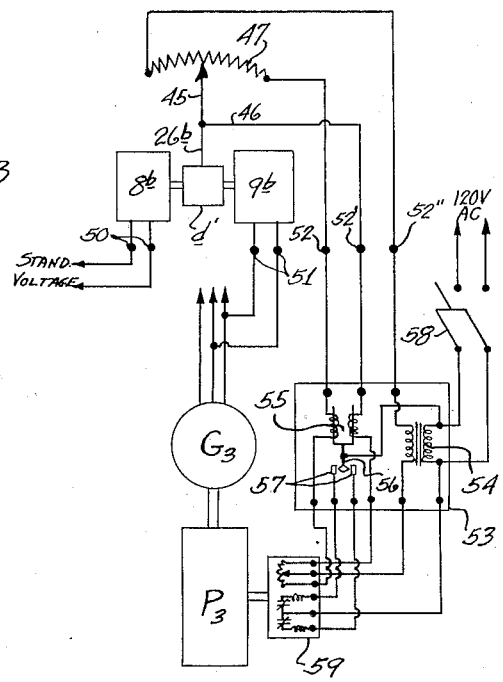
Figure 6 is a schematic wiring diagram, illustrating the manner in which the modified regulator of Figure 5 may be connected for matching the frequency of a selected alternator to a standard or selected frequency.
Figure 7:
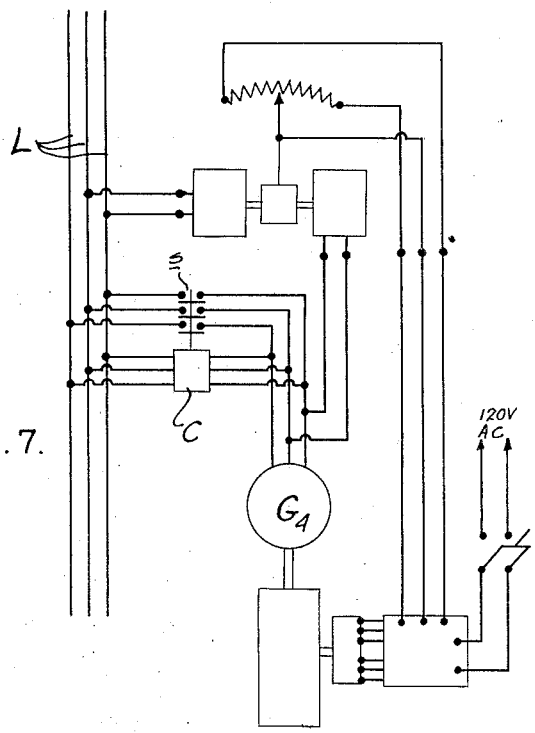
Figure 7 is a schematic wiring diagram, illustrating the manner in which the modified regulator of Figure 5 may be connected for matching the frequency of a selected alternator to the frequency of a selected line current with which the selected alternator is to be paralleled.

The modified form of frequency regulator, generally designated B, shown in Figures 5-7, both inclusive, comprises a suitable preferably rectangular cabinet $a'$ substantially similar in all respects to the cabinet $a$. Arranged suitably within the cabinet $a'$, are two synchronous motors $8^b$, $9^b$, connected by a differential mechanism $d'$, all substantially identical with the synchronous motors 8, 9, and connecting differential mechanism $d$.

Formed preferably integrally with, and extending upwardly from, the differential mechanism $d'$, is an arm $26^b$ provided at its upper end with an insulator block 44 and a sliding contactor arm 45, which is provided with a flexible lead 46 and at its upper extremity has wiping engagement across a resistance winding 47 mounted upon a suitable arcuate frame 48, in turn, bolted or otherwise fixed at its ends to and upon the front and rear walls of the cabinet $a'$ and provided at its ends with stop-lugs $l$, all as best seen in Figure 5.

Mounted for convenience upon the front wall of the cabinet $a'$, is a terminal block 49 provided with two pairs of terminal posts 50, 51, respectively designated "Line" and "Generator Input" and connected within the cabinet $a'$ with the synchronous motors $8^b$, $9^b$. The terminal block 49 is also provided with a group of three terminal posts 52, 52', 52", designated "To Modulator," the posts 52, 52", being connected electrically to the opposite ends of the resistance 47 and the intermediate terminal post 52' being connected in the nature of a potentiometer to the flexible lead 46 of the contactor arm 45.

The terminal posts 52, 52', 52", are electrically connected, in turn, to the input terminals of a controlling unit 53, which includes an input power transformer 54 and a sensitive unbalanced-detection relay 55, which latter acts upon a contactor arm 56 disposed between reversing contacts 57. The primary of the transformer 54 is, in turn, connected through a conventional switch 58 to any suitable source of 120 v. alternating current and also to a modulating motor 59 mechanically connected to the prime mover $P_3$ of an alternator $G_3$, one phase of the output of which is connected through the terminal posts 51 to the synchronous motor $9^b$, the other motor $8^b$ being connected to any selected standard source of voltage, all as best seen in Figure 6.

Through their electrical connections, the differential arm $26^b$ and the modulating motor 59 move, as it may be said, in unison, and the magnitude of the mechanical movement effected by the motor 59 will obviously bear a direct or proportional relation to the magnitude of movement of the arm $26^b$. Hence, when the frequency of the output of the generator $G_3$ either forges ahead or drops behind the frequency of the standard voltage, the resulting difference in speed between the motors $8^b$, $9^b$, will be transmitted as mechanical motion to the arm $26^b$, swinging the contactor arm 45 over the potentiometer resistance 47, and the proportional variation of current flowing in the branches of the potentiometer circuit will induce proportional movement of the modulating motor 59, the speed of the prime mover $P_3$ being increased or decreased as may be necessary.

Since the mechanical response induced in the modulating motor 59 as a result of frequency departure in the output of the alternator $G_3$ is directly proportional to the mechanical movement of the arm $26^b$ and is relatively slow, there is no over-control or hunting tendency and anti-hunting devices may be dispensed with. Where, as occasionally may occur, the frequency difference suddenly becomes extreme, so that the arm 45 is driven against one of the stop-lugs $l$, the friction rings 16 in the differential $d'$ will slip and thus protect the entire mechanism against jamming or other damage.

Figure 8:
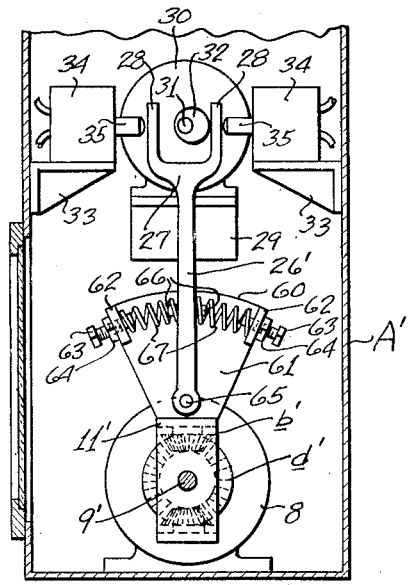
Figure 8 is a fragmentary plan view of a further modified form of regulator.

In the same manner, when desired, the regulator B may be connected, as shown in Figure 7, for matching or controlling the frequency of a generator $G_4$ to the voltage of a line L in co-operation with any conventional type of automatic paralleling control C adapted to close a paralleling switch $s$ at the precise moment when the frequency of the alternator $G_4$ has become equivalent to the frequency of the line L.

Where the type of generating system which is to be controlled has a characteristic of minute and relatively slow frequency deviations, it is possible that any one isolated deviation may be of such small magnitude as to fall below the limit of mechanical sensitivity of even the most carefully machined instrument. In such case, I may provide the modified form of regulator A', as shown in Figure 8, which is substantially similar in all respects to the previously described regulator A, including the switches 34, the constant speed motor 30 for driving the control cam 32, and the mechanically opposed synchronous motors 8, 9, the latter, for convenience of illustration, not being shown.

Operatively mounted between the motors 8, 9, in the manner previously described is a differential mechanism $d'$, which is likewise substantially similar to the previous differential mechanism $d$ and includes a rectangular frame $b'$ having a transverse top member 11'. Formed preferably integrally with and upstanding from the top member 11 is a segmentally shaped plate 60 having a machined, forwardly presented, vertical face 61 and being provided adjacent its upper transverse margin with opposed ears 62 projecting outwardly at right angles to the face 61 and suitably tapped for receiving adjustment screws 63, which are, in turn, provided with suitable lock-nuts 64.

Fixed in and projecting from the plate face 61 adjacent its lower extremity and equidistant from the ears 62 is a pivot-pin 65 for rockably supporting an upwardly extending arm 26', which is substantially identical with the previously described arm 26 and is provided at its upper end with a transverse yoke 27 and times 28, positioned between the switches 34 and on opposite sides of the cam 32. Fixed in and extending laterally from the arm 26' are oppositely projecting pins 66 positioned outwardly from the pivot-pin 65 at approximately the same radial distance as the adjustment screws 63 for retentive inserted engagement within the ends of matched compression springs 67, which are, in turn, supported at their other ends around the inwardly projecting ends of the adjustment screws 63.

When small and almost imperceptible frequency deviations are imposed upon the differential mechanism, it will move slightly in one direction or the other depending upon the positive or negative character of such deviation. If this movement is very slow in relation to the rate of rotation of the cam 32, the cam 32 will engage the tines 28 and tend to return them to neutral position before the control response is impressed upon one or the other of the switches 34. This return movement, however, is absorbed by compression of one or the other of the springs 67 and will not cause slippage of the clutches within the differential mechanism d'. Obviously, therefore, these small deviations will not be lost, but will, in fact, be accumulated in the springs 67 until the accumulated deviation is sufficient to compress one or the other of such springs 67 to such a point that the stored up energy in such spring will shift the arm 26' rapidly enough and far enough during the next released interval in the rotation of the cam 32 and thereby impose a control response upon the switches. By selecting springs 67 of proper compressive characteristics and strength and by making proper adjustments, it is possible to achieve an auxiliary control response which will cause the controlled generator to compensate for any accumulative loss or gain in frequency due to such minute deviations. In this same connection, it should be noted that the springs 67 will in themselves operate to balance minute deviations of opposite character, that is to say, if, during the interval in which minutes deviations are being accumulated in the springs 67, some of the deviations are positive in character and some of the deviations are negative in character, the springs 67 will operate to set off the one against the other and transmit only the accumulated net difference in such deviations whenever the net difference is sufficient to achieve a control-responsive movement of the arm 26'.

The apparatus fulfills in every respect the objects stated, and it should be understood that changes and modifications in the form, construction, arrangement, and combination of the several parts of the regulating apparatus may be made and substituted for those herein shown and described without departing from the nature and principle of my invention.

Having thus described my invention, what I claim and desire to secure by Letters Patent is:

1. Regulating apparatus of the character described comprising a pair of independently rotated shafts, differential means interposed between said shafts, an arm extending from said differential means and swingable in opposite directions dependent upon variations in the relative rotation of said shafts, two regulating switch means spaced apart and mounted on opposite sides of the swinging end of said arm and actuated by swinging movement of the arm, and means intermittently moving said arm to a neutral position out of contact with said switches.

2. Regulating apparatus of the character described comprising a pair of independently rotated shafts, differential means interposed between said shafts, an arm extending from said differential means and swingable in opposite directions dependent upon variations in the relative rotation of said shafts, two regulating switch means spaced apart and mounted on opposite sides of the swinging end of said arm and actuated by swinging movement of the arm, independently yielding clutch means between each of the motor shafts and the differential means, and means intermittently moving said arm to a neutral position out of contact with said switches.

3. Regulating apparatus of the character described comprising a pair of independently rotated shafts, differential means interposed between said shafts, an arm extending from said differential means and swingable in opposite directions dependent upon variations in the relative rotation of said shafts, two regulating switch means spaced apart and disposed with one of said switch means mounted on each side of and in the path of movement of the swinging end of said arm, said swingable arm having a bifurcated portion, and moving cam means within the bifurcated portion exerting swing force upon said arm to return said arm to a neutral position between said switches.

4. Regulating apparatus of the character described comprising a pair of independently rotated shafts, differential means interposed between said shafts, an arm extending from said differential means and swingable in opposite directions dependent upon variations in the relative rotation of said shafts, two regulating switch means spaced apart and disposed with one of said switch means mounted on each side of and in the path of movement of the swinging end of said arm, said swingable arm having a bifurcated portion, and a rotated cam within the bifurcated portion intermittently exerting swinging force upon said arm to return said arm to a neutral position between and out of operating contact with said switches.

5. Regulating apparatus of the character described comprising a pair of independently rotated shafts, differential means interposed between said shafts, an arm extending from said differential means and swingable in opposite directions dependent upon variations in the relative rotation of said shafts, two regulating switch means spaced apart and disposed with one of said switch means mounted on each side of and in the path of movement of the swinging end of said arm, said swingable arm having a bifurcated portion, moving cam means within the bifurcated portion exerting swinging force upon said arm to return said arm to a neutral position between said switches, and independently yielding clutch means between each of the motor shafts and the differential means.

6. Regulating apparatus of the character described comprising a pair of independently rotated shafts, differential means interposed between said shafts, an arm extending from said differential means and swingable in opposite directions dependent upon variations in the relative rotation of said shafts, two regulating switch means spaced apart and disposed with one of said switch means mounted on each side of and in the path of movement of the swinging end of said arm, said swingable arm having a bifurcated portion, independently yielding clutch means between each of the motor shafts and the differential means, and a rotated cam within the bifurcated portion intermittently exerting swinging force upon said arm to return said arm to a neutral position between and out of operating contact with said switches.

7. For use with an electrical apparatus including an alternating current generator having speed governing means and a source of electrical current having an established frequency and two opposed motors connected respectively with the source of electrical current of established frequency and with the output of the alternating current generator; regulating apparatus comprising differential means on the shafts of the two motors, an arm extending laterally from said differential means and oscillatably swingable responsive to variations in the speed of the two motors as transmitted through the differential means, and two spaced-apart switch means disposed on opposite sides of the swinging end of said arm and actuated by swinging movement of said arm.

8. Regulating apparatus of the character described, comprising a pair of oppositely rotated shafts, differential means interposed between said shafts, an arm extending from said differential means and swingable in opposite directions depending upon variations in the relative speed of rotation of said shafts, switch means actuated by the arm upon oscillation thereof through the differential due to relative variations in speed of rotation of the two motor shafts, a yoke at the outer swinging end of the arm, an auxiliary motor having a shaft extending between the tines of said yoke, and cam means on the shaft of said auxiliary motor for alternate engagement with the yoke tines for intermittently returning the arm to neutral position following oscillation by said frame.

WILSON A. CHARBONNEAUX.